United States Patent
Hu et al.

(10) Patent No.: US 10,257,473 B2
(45) Date of Patent: Apr. 9, 2019

(54) DOORBELL DEVICE AND METHOD THEREOF

(71) Applicant: Sercomm Corporation, Taipei (TW)

(72) Inventors: Shiou-Hua Hu, Taipei (TW); Benjamin Yeh, Taipei (TW); Yen-Ju Hsu, Taipei (TW)

(73) Assignee: SERCOMM CORPORATION, Taipei (TW)

( * ) Notice: Subject to any disclaimer, the term of this patent is extended or adjusted under 35 U.S.C. 154(b) by 559 days.

(21) Appl. No.: 14/872,215

(22) Filed: Oct. 1, 2015

(65) Prior Publication Data
US 2016/0219254 A1    Jul. 28, 2016

Related U.S. Application Data

(60) Provisional application No. 62/108,129, filed on Jan. 27, 2015.

(51) Int. Cl.
*H04N 7/18* (2006.01)
*G08B 3/10* (2006.01)

(52) U.S. Cl.
CPC .................... *H04N 7/186* (2013.01)

(58) Field of Classification Search
CPC ..... H04L 12/28; H04L 12/9054; H04N 5/232; H04N 7/18; H04N 7/186; G07C 5/0866; G07C 9/00111; G01N 21/9054; G05B 15/02; G05B 22/09
See application file for complete search history.

(56) References Cited

U.S. PATENT DOCUMENTS

| | | |
|---|---|---|
| 5,585,839 A | 12/1996 | Ishida et al. |
| 2003/0071902 A1 | 4/2003 | Allen et al. |
| 2006/0045324 A1* | 3/2006 | Katayama .......... G01N 21/9054 382/142 |
| 2010/0033570 A1 | 2/2010 | Plaster |
| 2010/0226484 A1 | 9/2010 | Wilkins |
| 2011/0234749 A1* | 9/2011 | Alon .................... G07C 5/0866 348/36 |
| 2014/0211062 A1 | 7/2014 | Kuo et al. |
| 2015/0156031 A1* | 6/2015 | Fadell ................. H04L 12/2816 700/276 |
| 2015/0163463 A1* | 6/2015 | Hwang ................. H04N 7/188 348/143 |

FOREIGN PATENT DOCUMENTS

| | | |
|---|---|---|
| CN | 102722321 A | 10/2012 |
| CN | 103402004 A | 11/2013 |
| CN | 103516900 A | 1/2014 |
| CN | 103856707 A | 6/2014 |
| CN | 103970472 A | 8/2014 |
| CN | 104184941 A | 12/2014 |
| EP | 1480450 A2 | 11/2004 |

* cited by examiner

*Primary Examiner* — Patricia I Young
(74) *Attorney, Agent, or Firm* — McClure, Qualey & Rodack, LLP

(57) ABSTRACT

A doorbell device is provided. The doorbell device includes a first camera unit, a second camera unit, a doorbell button, and a processing unit. The first camera unit includes a first camera lens and a first image sensor, generating a first video. The second camera unit includes a second camera lens and a second image sensor, generating a second video. The processing unit selectively activates one of the first camera unit and the second camera unit according to at least one of the first video, the second video, and a state of the doorbell button.

5 Claims, 5 Drawing Sheets

DOORBELL DEVICE AND METHOD THEREOF

This application claims the benefit of U.S. provisional application Ser. No. 62/108,129, filed Jan. 27, 2015, the subject matter of which is incorporated herein by reference.

BACKGROUND

Field of the Invention

The disclosure relates in general to a doorbell device, and more particularly to a doorbell device with cameras.

Related Art

Doorbell has been widely used in most families at the door entrance. When a visitor arrives or when a resident comes back home, the doorbell may be pressed to generate sound to inform a person in the building. In addition, Internet protocol (IP) camera has also been widely used in home environment in modern life, especially for the purpose of home security. IP camera is able to generate and then send video data via network connection. For a home surveillance system, there is a need for integrating an IP camera into a doorbell device.

SUMMARY

The disclosure is directed to a doorbell device.

According to one embodiment of the invention, a doorbell device is provided. The doorbell device includes a first camera unit, a second camera unit, a doorbell button, and a processing unit. The first camera unit includes a first camera lens and a first image sensor, generating a first video. The second camera unit includes a second camera lens and a second image sensor, generating a second video. The processing unit selectively activates one of the first camera unit and the second camera unit according to at least one of the first video, the second video, and a state of the doorbell button.

According to one embodiment of the invention, a method to be performed by a doorbell device is provided. The doorbell device includes a doorbell button, a first camera unit, and a second camera unit. The method includes the following steps: generating a first video by the first camera unit; generating a second video by the second camera unit; and selectively activating one of the first camera unit and the second camera unit according to at least one of the first video, the second video, and a state of the doorbell button.

The invention will become apparent from the following detailed description of the preferred but non-limiting embodiments. The following description is made with reference to the accompanying drawings.

Figure 1:
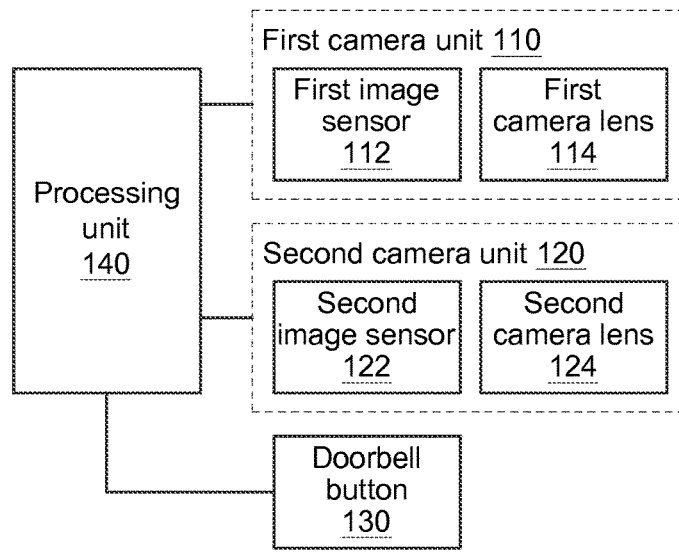
FIG. 1 shows a diagram of a doorbell device according to one embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

An IP camera may be integrated into a doorbell to provide both functions. The camera lens of the IP camera may be used to monitor the incoming visitor. Because both modules are integrated in a single device, the camera lens is located near the doorbell button. The doorbell button is usually installed about 4 feet above the floor to be visible and easily reachable. Therefore the camera lens has to be tiled upward to capture the face of the visitor. However, such camera lens faces the sky rather than monitors the surrounding environment at a proper angle. A doorbell device is proposed in this disclosure to accomplish both functions of doorbell and IP camera for a home surveillance system.

FIG. 1 shows a diagram of a doorbell device 1 according to one embodiment of the invention. The doorbell device 1 includes a first camera unit 110, a second camera unit 120, a doorbell button 130, and a processing unit 140. The first camera unit 110 includes a first camera lens 114 and a first image sensor 112. The first image sensor 112 may be a complementary metal-oxide-semiconductor (CMOS) sensor or a charge-coupled device (CCD) sensor. The first camera unit 110 generates a first video V1. The first video V1 may be raw video data. Similarly, the second camera unit 120 includes a second camera lens 124 and a second image sensor 122. The second camera unit 120 generates a second video V2, which may also be raw video data. An incoming visitor may press the doorbell button 130 to trigger an indoor chime to generate sound. The processing unit 140 is configured to selectively activate one of the first camera unit 110 and the second camera unit 120 according to at least one of the first video V1, the second video V2, and a state of the doorbell button 130. The processing unit 140 may be a general purpose processor, a microcontroller, a digital signal processor, or an application specific integrated circuit.

Figure 2:
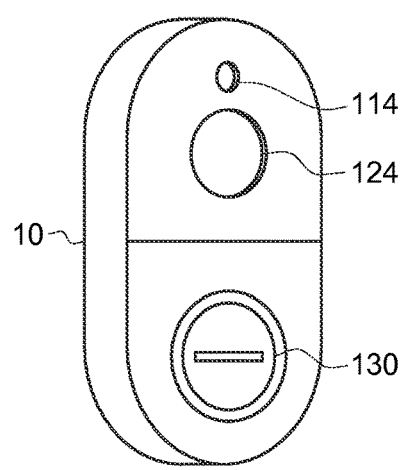
FIG. 2 shows an appearance of the doorbell device according to one embodiment of the invention.

For a better understanding of the doorbell device 1, please refer to FIG. 2. FIG. 2 shows an appearance of the doorbell device 1 according to one embodiment of the invention. The doorbell device 1 has an outer housing 10, which may be either metal or plastic. From a user's perspective view, the first camera lens 114, the second camera lens 124, and the doorbell button 130 are visible. The processing unit 140, such as an IC chip, may be disposed interior to the outer housing 10.

There are two camera units 110 and 120 in the doorbell device 1. The two camera units may serve for different purposes. In one embodiment, the first camera unit 110 acts as a doorbell eye, while the second camera unit 120 acts as a surveillance eye. For example, the second camera unit 120 is used to monitor the surrounding environment. The second video V2 may be recorded twenty-four hours a day. The second camera unit 120 is mainly for surveillance purpose, such as detecting a suspicious burglar activity.

On the other hand, the first camera unit 110 is used to capture the face of an incoming visitor. For example, when a visitor presses the doorbell button 130, or when a delivery guy approaches the door entrance, the first camera unit 110 captures the image of the visitor. The first video V1 may be uploaded via network connection, such that the house owner is able to see the visitor's face on a mobile device with network connection capability. As another example, the first video V1 may also be transmitted directly to a monitor located inside the house.

Figure 3:
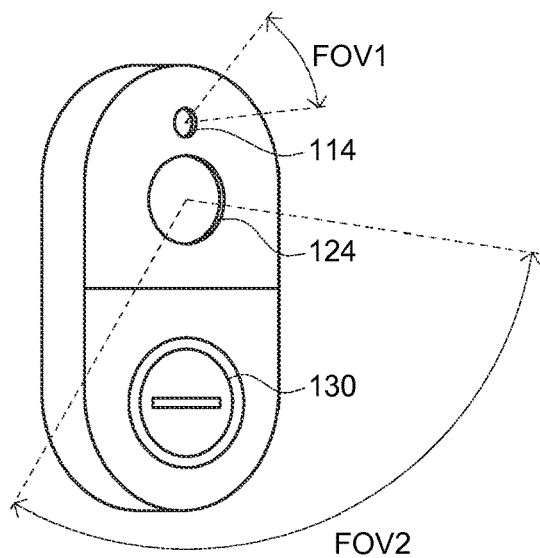
FIG. 3 shows a diagram illustrating field of views of the two camera units according to one embodiment of the invention.

Because the second camera unit 120 aims at the surroundings, while the first camera unit 110 aims at a person's face, the field of view FOV1 of the first camera unit 110 may be smaller than the field of view FOV2 of the second camera unit 120. FIG. 3 shows a diagram illustrating field of views of the two camera units according to one embodiment of the invention. In one embodiment, the field of view FOV1 of the first camera unit 110 is smaller than 70 degrees. The field of view FOV2 of the second camera unit 120 is larger than 90 degrees. For example, the field of view FOV1 of the first camera unit 110 may range from 40 degrees to 70 degrees. The field of view FOV2 of the second camera unit 120 may range from 90 degrees to 180 degrees.

In one embodiment, a fisheye lens may be adopted as the second camera lens 124. The field of view of a fisheye lens is usually between 100 and 180 degrees. The fisheye lens achieves extremely wide field of view to capture the most objects in the scene, which is suitable for a surveillance application. Although the fisheye lens may produce barrel distortion in the captured image, image distortion is rarely an issue in home security application. On the contrary, the first camera unit 110 may adopt a camera lens that does not produce much image distortion since the first video V1 is intended for face recognition. A highly distorted image may make it difficult to recognize the incoming visitor. In addition, the field of view FOV1 of the first camera unit 110 may be smaller than 70 degrees because the target area of the first camera unit 110 is a person's head or a person's upper body.

The second camera unit 120 may be installed horizontally without tilting to have a good environmental view. That is, the pointing direction of the second camera lens 124 may be parallel to the floor. On the other hand, because the first camera unit 110 aims at a height of a person's face, the first camera lens 114 may be tilted upward to see clearly the visitor's face. In other words, the pointing direction of the first camera lens 114 may be toward the sky.

Figure 4:
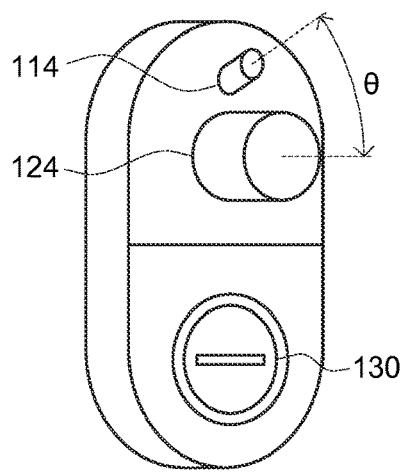
FIG. 4 shows a diagram illustrating optical axes of the two camera units according to one embodiment of the invention.

FIG. 4 shows a diagram illustrating optical axes of the two camera units according to one embodiment of the invention. In FIG. 4 the size of the first camera lens 114 and the second camera lens 124 are exaggerated to clearly show the difference between the orientations of these two camera lens. In one embodiment, the angle θ between the optical axis (a line along which there is rotational symmetry in a camera lens) of the first camera lens 114 and the optical axis of the second camera lens 124 is larger than 10 degrees. For example, the angel θ may range from 10 degrees to 90 degrees. The angle θ may be pre-determined during the manufacturing process (fixed lens arrangement) or may be dynamically adjusted (such as a rotating lens). The angle θ depends on the distance the visitor is away from the doorbell device.

Furthermore, because the first camera unit 110 captures the visitor's face and the second camera unit 120 captures a wide area of the surrounding environment, the resolution of the first video V1 may be lower than the resolution of the second video V2. For example, the first video V1 has VGA resolution (480p) and the second video V2 has HD resolution (720p). The disclosure is not limited thereto, the first video V1 and the second video V2 may also both have HD resolution for a better image quality. As stated above, the first camera unit 110 and the second camera unit 120 serve for different purposes. Because the first camera unit 110 neither requires wide field of view nor requires high image resolution, the cost of the first camera unit 110 can be saved effectively.

Depending on the scenario, the processing unit 140 is configured to selectively activate one of the first camera unit 110 and the second camera unit 120. In a normal condition the second camera unit 120 is activated to monitor the surrounding environment. When the doorbell button 130 is pressed, the operation may be temporarily switched to the first camera unit 110 for capturing the face of the visitor pressing the doorbell button 130. After the first camera unit 110 has been activated for a predetermined time period, such as 30 seconds or 1 minute, the processing unit 140 switches to activate the second camera unit 120. For example, when a visitor presses the doorbell button 130, the first camera unit 110 is activated to capture the visitor's face. If the house owner does not respond in time, the visitor may press the doorbell button 130 repeatedly. After the internal timer, which calculates the time period since the last time the doorbell button 130 has been pressed, has reached the predetermined time period, the processing unit 140 switches to activate the second camera unit 120. In this case the first camera unit 110 remains being activated until the visitor eventually leaves.

Figure 5:
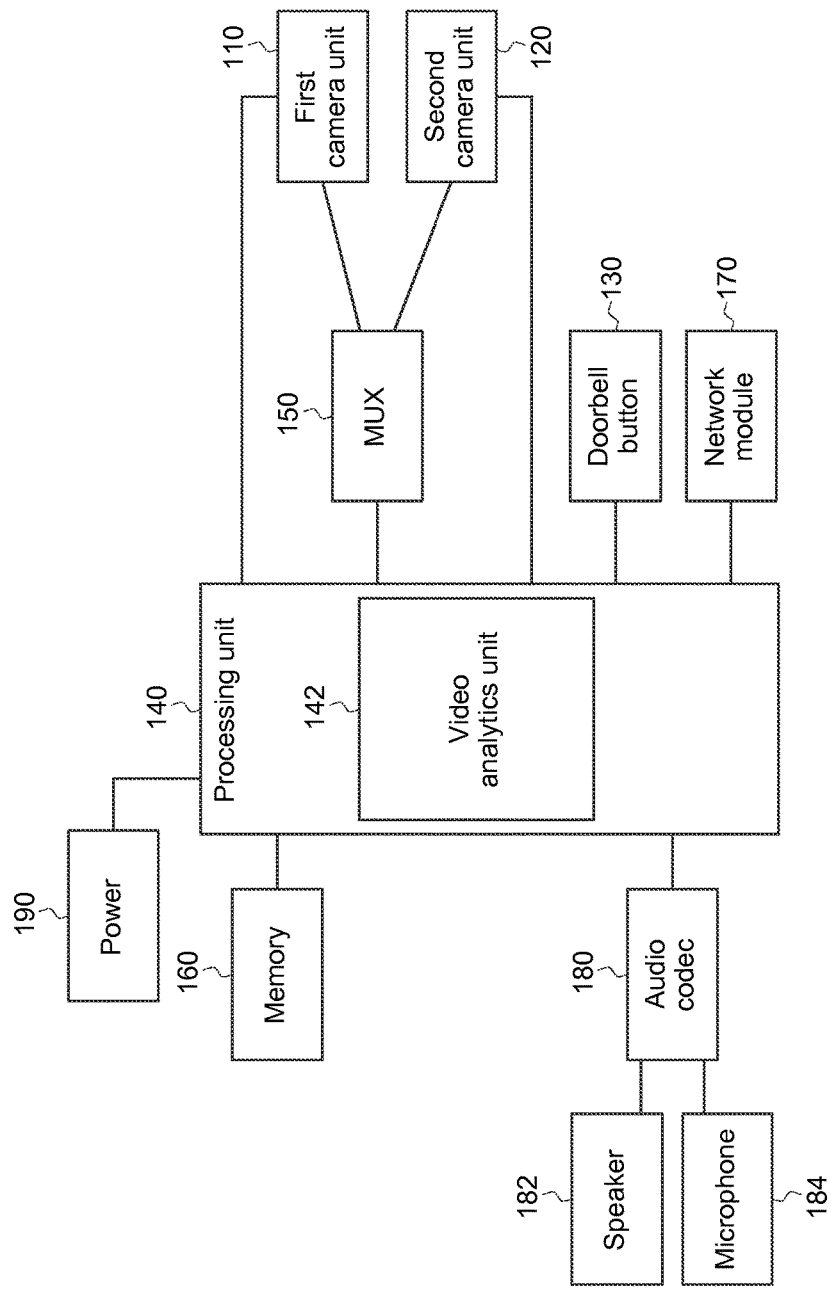
FIG. 5 shows a diagram of a doorbell device according to one embodiment of the invention.

The processing unit 140 may also depend on the first video V1 and/or the second video V2 to selectively activate one of the first camera unit 110 and the second camera unit 120. FIG. 5 shows a diagram of a doorbell device 2 according to one embodiment of the invention. In addition to the first camera unit 110, the second camera unit 120, the doorbell button 130, and the processing unit 140, the doorbell device 2 further includes a multiplexer (MUX) 150, a memory 160, a network module 170, an audio codec module 180, a power module 190, a speaker 182 and a microphone 184. The processing unit 140 includes a video analytics unit 142, which is configured to perform motion detection on the first video V1 and/or the second video V2. The video analytics unit 142 may be a software program regarding motion detection. The software program may be loaded from memory 160 and executed by the processing unit 140. The video analytics unit 142 may also be a hardware chipset with motion detection capability.

In one embodiment, the processing unit 140 is configured to analyze the video data recorded to determine whether to activate the first camera unit 110 or the second camera unit 120. For example, in a normal condition the second camera unit 120 is activated to record the second video V2. When a person approaches the door entrance, the video analytics unit 142 analyzes the second video V2 and detects a concerned motion (for example, a person is close enough to the house) in the second video V2, the first camera unit 110 is then activated to capture the image of the concerned motion. After starting to record the first video V1, the processing unit 140 then determines to switch back to the second camera unit 120 when the video analytics unit 142 detects the concerned event disappears (for example, the person leaves and becomes distant away from the house) in the first video V1. This switching mechanism is useful in the scenario where the incoming visitor does not press the doorbell button 130, such as a mail carrier delivering a heavy box.

The MUX 150 is one possible implementation for switching between the first camera unit 110 and the second camera unit 120. The processing unit 140 may select the incoming video source by controlling the MUX 150 according to at least one of the state of the doorbell button 130, the first video V1 and the second video V2. The processing unit 140 is also capable of encoding the first video V1 and/or the second video V2 to transmit the encoded video by the network module 170. The network module 170 may be connected to the Internet via Ethernet, Wi-Fi, LTE, or other communication standards. Therefore the encoded video may be transmitted for live streaming whether the first camera unit 110 or the second camera unit 120 is being activated.

The power module 190 supplies power to the doorbell device 2. When the doorbell button 130 is pressed, power originally supplied to the interior of the doorbell device 2 may be switched to be supplied to the chime device located indoors. The power module 190 may be equipped with a battery or a capacitor such that the doorbell device 2 can still be supplied power when the doorbell button 130 is pressed. Therefore the first camera unit 110 and the processing unit 140 still function properly when the doorbell button 130 is pressed.

The audio codec module 180 compresses and decompresses the audio data. The speaker 182 and microphone 184, which may be disposed on the outer housing of the doorbell device 2, facilitate interactive communication between the visitor and the house owner. Thus the house owner can use a mobile phone to talk with the incoming visitor.

For example, when a visitor presses the doorbell button 130. The first camera unit 110 is activated to capture the visitor's face. The processing unit 140 is configured to initiate an interactive communication session when the first camera unit 110 is activated. The interactive communication session may be an ordinary telephone call, a video call, or a conversation via an intercom. In one embodiment, after the first camera unit 110 is activated, the processing unit 140 is configured to activate the second camera unit 120 when the interactive communication session is rejected or finished.

Figure 6:
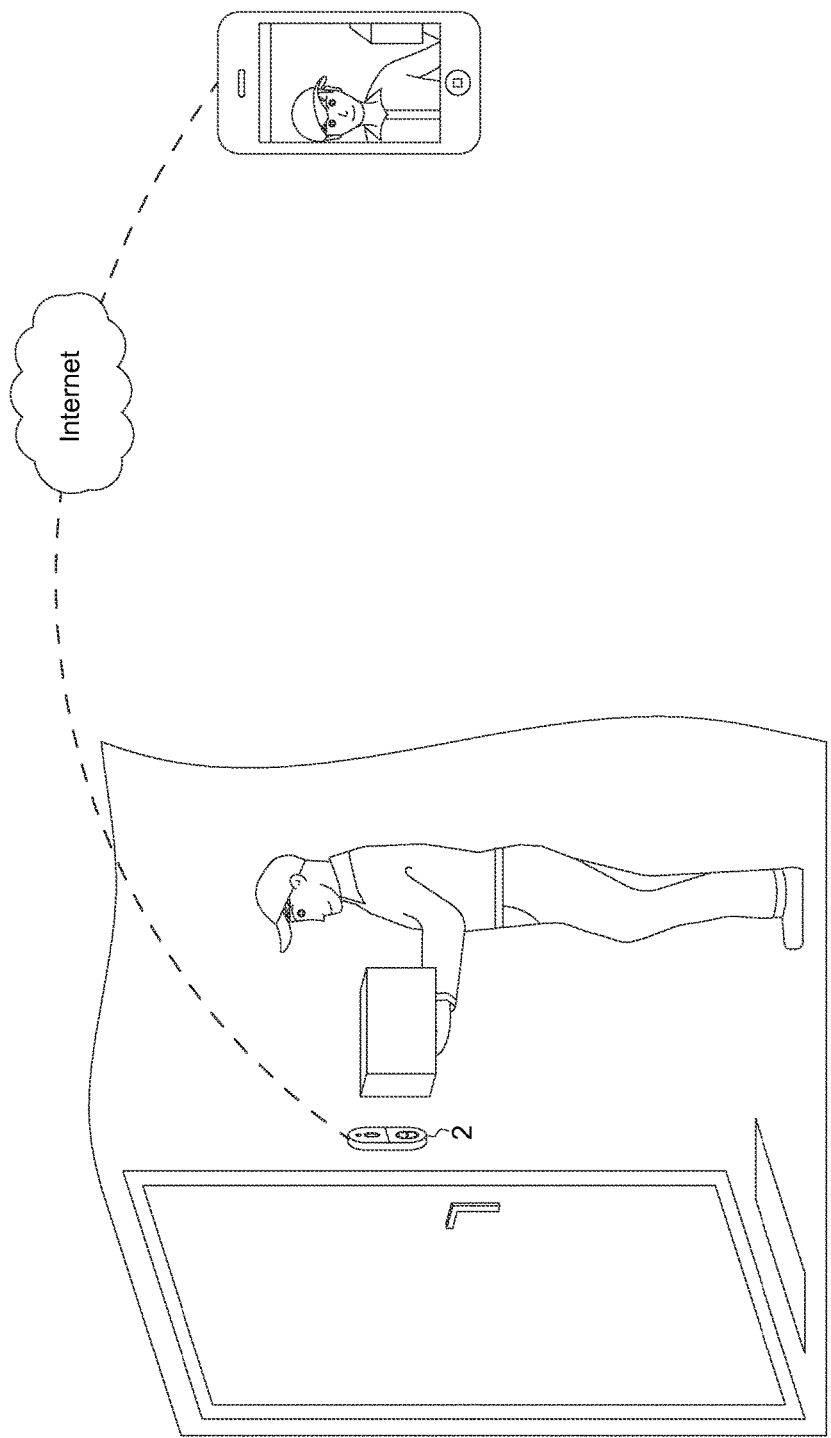
FIG. 6 shows an example of an interactive communication session according to one embodiment of the invention.

FIG. 6 shows an example of an interactive communication session according to one embodiment of the invention. In this example, the interactive communication session is initiated by generating a video call to a mobile phone. The encoded first video V1 is transmitted by the network module 170 to the Internet. The mobile phone may also be connected to the Internet via WiFi, 3G, LTE, or any other communication technology. The house owner carrying the mobile phone now sees an incoming call from the doorbell device 2 and decides whether to pick it up. In one embodiment, if the call is rejected (for example, the house owner does not want to respond to this visitor), the processing unit 140 is configured to activate the second camera unit 120. In other words, the doorbell device 2 is switched to surveillance mode when the call is rejected. If the call is accepted, the first video V1 may be displayed on the phone, and the interactive communication session may be established. The house owner can not only have conversation with the visitor but also see the visitor in real time. In one embodiment, the processing unit 140 may determine to switch back to the second camera unit 120 when this conversation between the visitor and the house owner ends.

In summary, the doorbell device disclosed herein includes two camera units. One camera unit acts as a doorbell eye, serving for intercom purpose. The other camera unit acts as a surveillance eye, serving for home security purpose. With the dual lens design, the doorbell device can view the surrounding environment constantly with clear view during the normal usage as an outdoor surveillance camera. When there is a visitor or service person coming close to the door or pressing the doorbell button, the doorbell device can switch to the other lens with up-tilted view angle, which can better catch the face of the incoming visitor. Two-way audio is also available to facilitate communication with the visitor.

The camera lens and the image sensor for the doorbell eye can use narrower FOV and lower resolution while the camera lens and the image sensor for the surveillance eye can be a broader FOV and higher resolution. The FOV and the resolution parameters for each camera unit are suitable for the specific application. Also the narrower FOV and lower resolution requirement for the doorbell eye saves the production cost of the doorbell device.

The doorbell device in this disclosure may further include a video analytics unit for performing motion detection. The video recorded by the two camera units are analyzed to know whether a person is approaching or leaving the door entrance. The video analytics unit aids the determination of whether to switch to the first camera unit or the second camera unit. With the video analytics unit, even if the incoming visitor does not press the doorbell button, the processing unit can still activates the first camera unit to capture the visitor's face.

Figure 7:
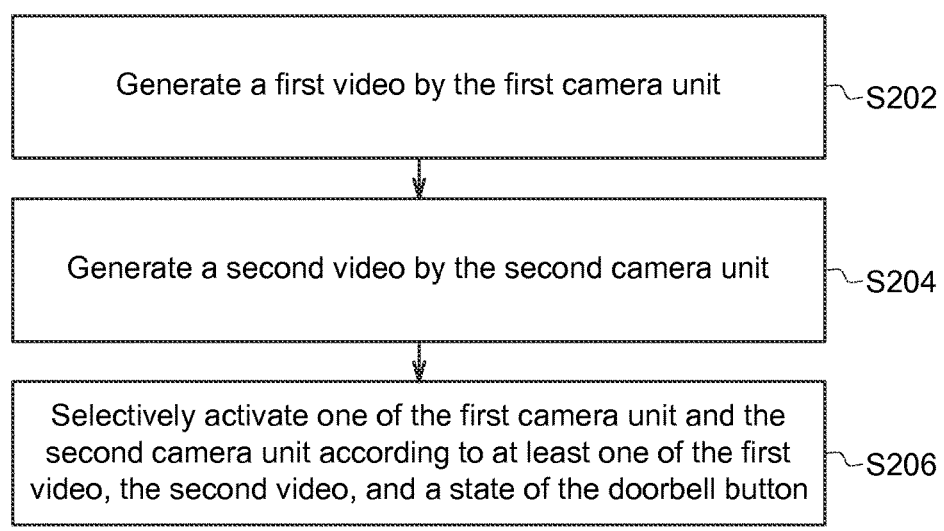
FIG. 7 shows a flowchart of a method to be performed by a doorbell device according to one embodiment of the invention.

FIG. 7 shows a flowchart of a method to be performed by a doorbell device according to one embodiment of the invention. The doorbell device includes a doorbell button, a first camera unit, and a second camera unit. The method includes the following steps. Step S202: generating a first video V1 by the first camera unit. Step S204: generating a second video V2 by the second camera unit. Step S206: selectively activating one of the first camera unit and the second camera unit according to at least one of the first video V1, the second video V2, and a state of the doorbell button. For ease of understanding, the method is delineated as separate steps represented as independent blocks in FIG. 7. However, these separately delineated steps should not be construed as necessarily order dependent. The order in which the process is described is not intended to be construed as a limitation, and any number of the described process blocks maybe be combined in any order to implement the method.

Embodiments regarding the implementation of this doorbell control method have been described in FIGS. 1-6 and related disclosure. As described above, the doorbell control method may further include the step of performing motion detection on the first video V1 and/or the second video V2. The second camera unit is activated in normal conditions. The first camera unit may be activated when: (a) the doorbell button is pressed, or (b) a concerned motion is detected in the second video V2. After the first camera unit is activated to capture the visitor's face, the doorbell control method may further include the step of initiating an interactive communication session. The second camera unit may be activated when: (a) a predetermined time period has elapsed after the doorbell button is pressed, (b) the interactive communication session is rejected, (c) the interactive communication session is finished, or (d) the concerned motion is detected as disappeared in the first video V1.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:
1. A doorbell device, comprising:
a first camera unit, comprising a first camera lens and a first image sensor, configured to generate a first video;

a second camera unit, comprising a second camera lens and a second image sensor, configured to generate a second video;

a doorbell button;

the first camera unit and the second camera unit configured to be integrated into a single doorbell device;

a processing unit, configured to selectively activate one of the first camera unit and the second camera unit according to at least one of the first video, the second video, and a state of the doorbell button, wherein the processing unit is configured to activate the first camera unit when the doorbell button is pressed, and wherein a field of view of the first camera unit is smaller than a field of view of the second camera unit;

the processing unit is configured to activate the second camera unit a predetermined time period after the doorbell button is pressed; and capturing, by the first camera unit, an image of a visitor to be uploaded via network connection when the first camera unit is activated.

2. The doorbell device according to claim 1, wherein a field of view of the first camera unit is smaller than 70 degrees, and a field of view of the second camera unit is larger than 90 degrees.

3. The doorbell device according to claim 1, wherein an angle between an optical axis of the first camera lens and an optical axis of the second camera lens is larger than 10 degrees.

4. The doorbell device according to claim 1, wherein a resolution of the first video is lower than a resolution of the second video.

5. A method to be performed by a doorbell device, the doorbell device comprising a doorbell button, a first camera unit, and a second camera unit, the first camera unit and the second camera unit configured to be integrated into a single doorbell device, wherein a field of view of the first camera unit is smaller than a field of view of the second camera unit, the method comprising:

generating a first video by the first camera unit;

generating a second video by the second camera unit;

selectively activating one of the first camera unit and the second camera unit according to at least one of the first video, the second video, and a state of the doorbell button;

activating the first camera unit when the doorbell button is pressed; and activating the second camera unit a predetermined time period after the doorbell button is pressed; and capturing, by the first camera unit, an image of a visitor to be uploaded via network connection when the first camera unit is activated.

* * * * *